(12) United States Patent
Eineke

(10) Patent No.: US 7,121,386 B1
(45) Date of Patent: Oct. 17, 2006

(54) BICYCLE BRAKING SYSTEM

(75) Inventor: Marlin Eineke, 2611 Otley Ave., Perry, IA (US) 50220

(73) Assignee: Marlin Eineke, Perry, IA (US)

( * ) Notice: Subject to any disclaimer, the term of this patent is extended or adjusted under 35 U.S.C. 154(b) by 0 days.

(21) Appl. No.: 11/163,837

(22) Filed: Nov. 1, 2005

(51) Int. Cl.
*B62L 3/08* (2006.01)

(52) U.S. Cl. ................. 188/24.16; 188/24.15

(58) Field of Classification Search .. 188/24.11–24.22, 188/2 D; 74/502.2, 502.4, 502.6
See application file for complete search history.

(56) References Cited

U.S. PATENT DOCUMENTS

| | | | | |
|---|---|---|---|---|
| 3,942,609 A | * | 3/1976 | Hill | 188/24.16 |
| 4,057,127 A | * | 11/1977 | Woodring | 188/24.16 |
| 4,480,720 A | * | 11/1984 | Shimano | 188/24.15 |
| 4,653,613 A | * | 3/1987 | Blancas | 188/24.11 |
| 4,773,510 A | * | 9/1988 | Sato | 188/24.16 |
| 5,431,255 A | * | 7/1995 | Tsuchie | 188/24.16 |
| 5,540,304 A | * | 7/1996 | Hawkins et al. | 188/24.15 |
| 5,845,539 A | * | 12/1998 | Huang | 74/489 |
| 2002/0185349 A1 | * | 12/2002 | Jakovljevic | 188/344 |
| 2003/0140724 A1 | | 7/2003 | Lee et al. | |

FOREIGN PATENT DOCUMENTS

| | | |
|---|---|---|
| DE | 4122491 A1 | 1/1993 |
| JP | 409048383 A | 2/1997 |
| JP | 411105771 A | 4/1999 |

* cited by examiner

*Primary Examiner*—Christopher P. Schwartz

(57) ABSTRACT

A braking system for a bicycle. The system has a front and back wheel braking handles that each have a braking cables that extend to a front wheel and a back wheel respectively. Extending between the front and back braking handles is an interconnecting braking cable. The front braking cable has a rocker therein such that when the rocker is used in association with the interconnecting cable the front brake of the bicycle is actuated and deactuated as the back brake of the bicycle is also actuated and deactuated.

4 Claims, 3 Drawing Sheets

BICYCLE BRAKING SYSTEM

BACKGROUND OF THE INVENTION

This invention relates to a bicycle braking system. More specifically this invention relates to a bicycle braking system that allows the front brake of the bicycle to be actuated and regulated only as the back brake is used and released.

Traditional bicycle braking systems comprise a pair of brake handles that are pivotally connected to handlebars such that when pivoted or clasped by a user, the brake cables that run to calipers on the wheels of a bicycle frictionally cause a stop in rotation of a bike wheel. Thus, a front wheel braking handle has a cable that runs from the handle to a front tire and the back wheel braking handle has a cable that runs to a back tire. When bicycling and an individual actuates the front wheel braking handle without actuating the back wheel braking handle, the bike has a tendency to flip over causing injury or death.

Therefore, a primary object of the present invention is to provide a bicycle braking system that is easy to manufacture and causes improved braking.

These and other features, objects, and advantages will become apparent through the specification and claims.

BRIEF SUMMARY OF THE INVENTION

A braking system for a bicycle, or bike, having front wheel and back wheel braking handles mounted on the handle bar of a bicycle frame. The front wheel braking handle has a braking cable extending from the handle to a caliper on the front wheel for frictionally engaging the front wheel of the bike. The back wheel braking handle has a second braking cable that extends from the braking handle to a second caliper on the back wheel of a bike for frictionally stopping the back wheel of the bike. Extending between the front wheel and back wheel braking handles is an interconnecting braking cable that is secured to and sags between the braking handles. The front wheel braking handle is designed to have a rocker that functions to ensure the front wheel brake is only able to be actuated when the back wheel braking handle is actuated.

DETAILED DESCRIPTION OF THE PREFERRED EMBODIMENT

Figure 1:
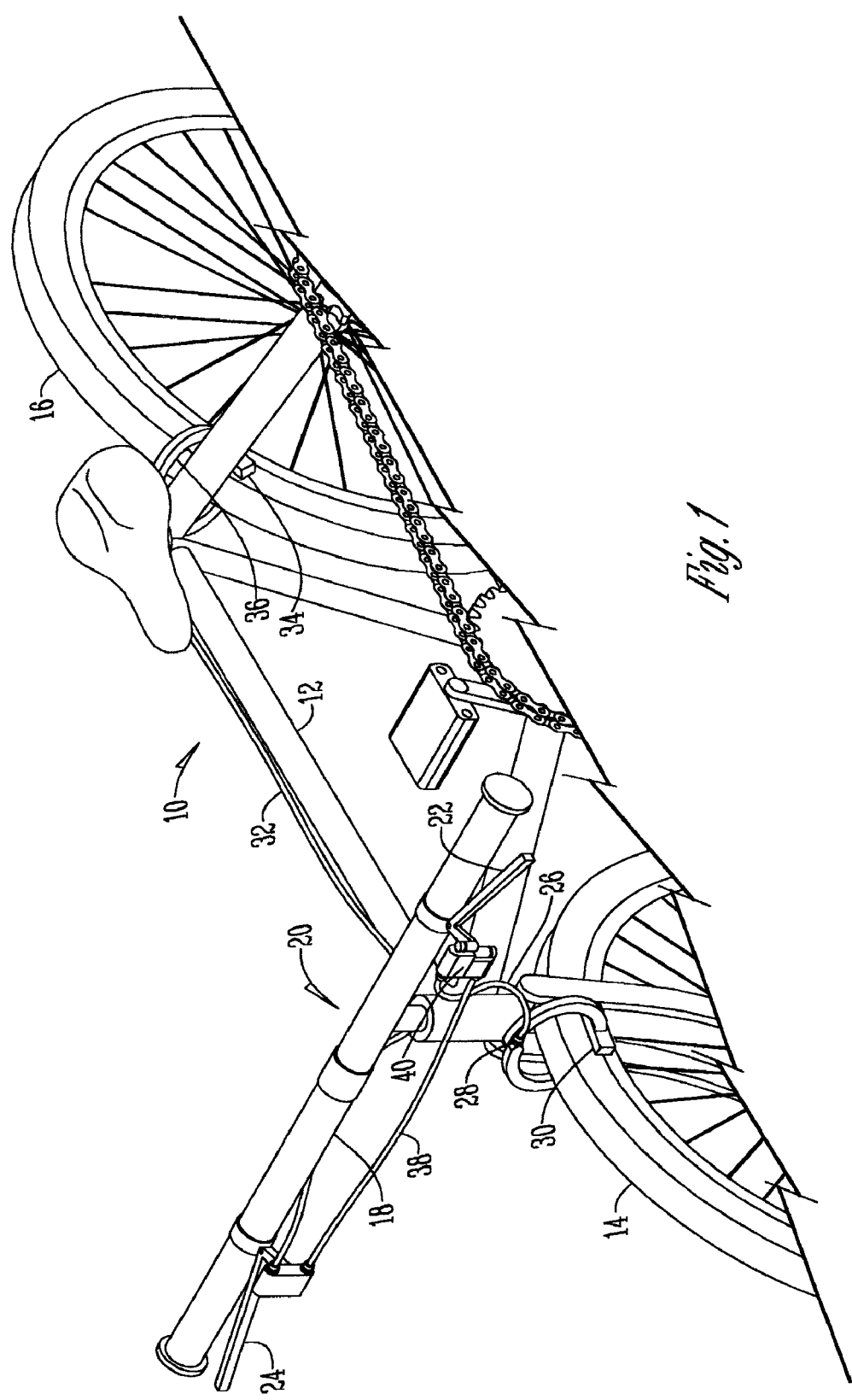
FIG. 1 is a elevated perspective view of a bicycle having a braking system.
Figure 2:
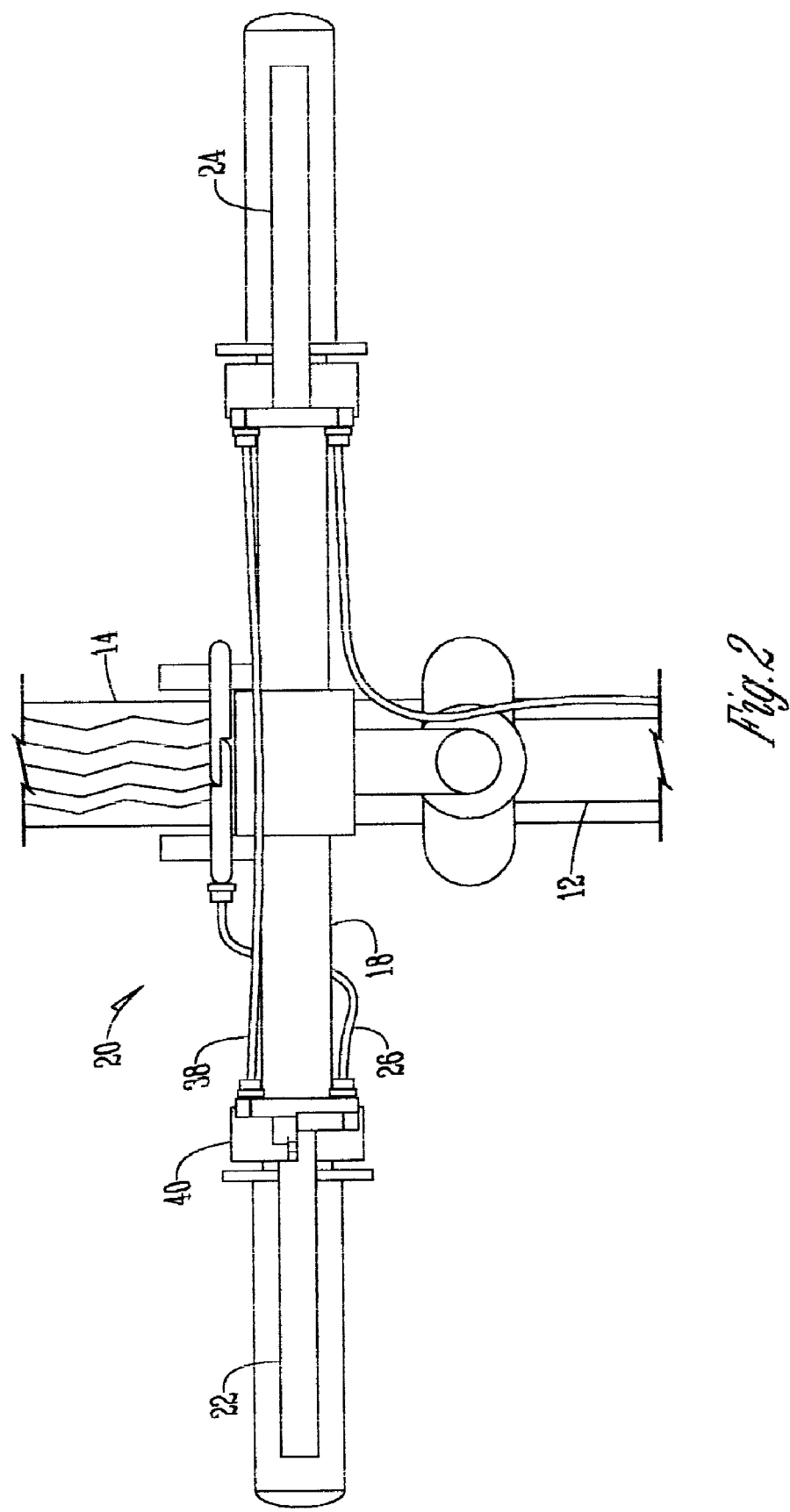
FIG. 2 is a plan view of a braking system for a bicycle showing a rocker.

FIG. 1 shows a bicycle 10 having a frame 12 with a front and back wheels 14, 16 and a handlebar 18 thereon. Bicycle 10 has a braking system 20 that is best shown in FIG. 2. Braking system 20 includes a front wheel braking handle 22 that is pivotally attached to the handlebar 18 and a back wheel braking handle 24 that is pivotally attached to the handlebar 18. Extending from the front wheel braking handle 22 is a front wheel braking cable 26 that extends to a front wheel caliper 28 that when actuated brakes the front wheel 14 via front wheel brakes 30. Similarly, extending from the back wheel braking handle 24 is a back wheel braking cable 32 that extends to a back wheel caliper 34 that when actuated causes the back wheel 16 to be frictionally stopped by back wheel brakes 36.

Figure 3:
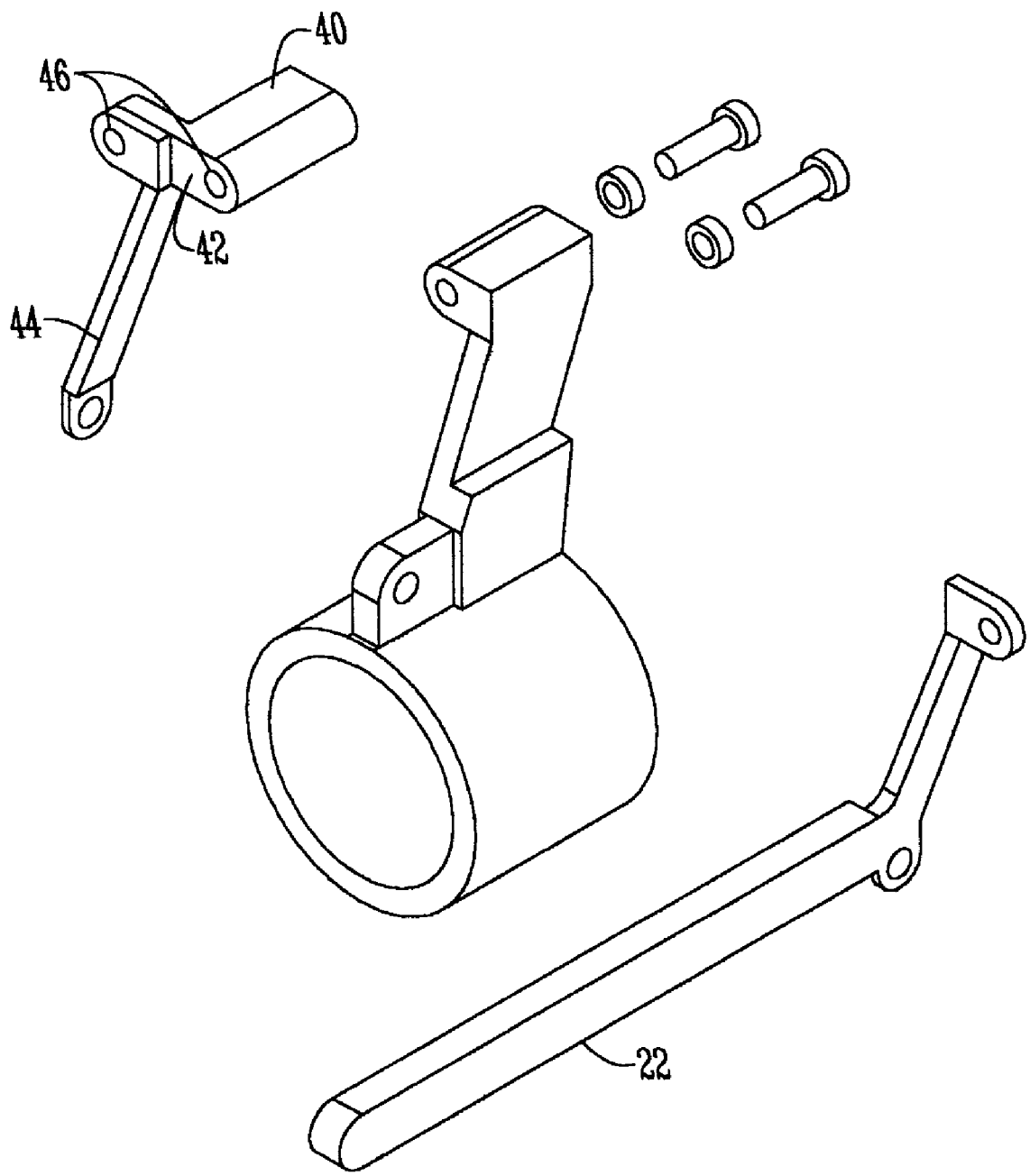
FIG. 3 is a perspective view of a front braking handle having a rocker.

Extending between the front wheel braking handle 22 and the back wheel braking handle 24 is an interconnecting braking cable 38. As best seen in FIGS. 2 and 3 the front wheel braking handle has a rocker 40 that engages both the front wheel braking cable 26 and the interconnecting braking cable 38. The rocker 40 (FIG. 3) has a body 42, a rocker arm 44 extending from the body 42, and a plurality of cavities 46 for receiving the interconnecting cable 38 and the front braking cable 26.

In operation, in a starting position, neither wheel braking handle 22 or 24 is actuated, and the interconnecting braking cable 38 sags between the front wheel braking handle 22 and the back wheel braking handle 24. When the front wheel braking handle 22 is actuated the rocker 40 pulls the interconnecting braking cable 38 until the cable 38 is taut between the front wheel braking handle 22 and the back wheel braking handle 24. Because of the rocker 40 the actuation of the front wheel braking handle 22 only causes the slack or sag to be pulled out of the interconnecting cable 38 and does not actuate or pull the front wheel braking cable 26 and no braking of the front wheel occurs.

Again, when in the starting position, if the back wheel braking handle 24 is actuated the handle pulls both the back wheel braking cable 32 and the interconnecting cable 38 taut. Thus, if the front wheel braking handle 22 is actuated when the back wheel braking handle 24 is also actuated and the interconnecting cable 38 is taut, the tension in the cable 38 causes the rocker 40 to pull the front wheel braking cable 26 to brake the front wheel. Therefore, the front wheel brakes 30 are only actuated if the back wheel brakes 36 are already actuated.

Additionally, depending on the position of the back wheel braking handle 24 the front wheel brakes 30 are applied proportionately. Specifically the front wheel brakes 30 are able to be applied in proportion to the amount of slack there is in the interconnecting cable 38. This is because the rocker 40 pulls the interconnecting cable 38 until the cable 38 is taut. Once the cable 38 is taut the rocker 40 causes the front wheel braking cable 26 to be pulled.

When both the back braking handle 24 and the front wheel braking handle 22 are actuated the interconnecting cable 38 is taut and both the front and back wheel brakes 30, 36 are applied. As the back braking handle 24 is released slack is provided to the interconnecting cable 38 and the rocker 40 causes a proportional slack to occur within the front wheel braking cable 26 thus releasing the front wheel brake 30. When the back braking handle 24 is no longer actuated the rocker 40 ensures that the front wheel brake 30 similarly is not actuated. Therefore, releasing the back wheel braking handle 24 automatically releases the front wheel brake 30. Thus, at the very least, all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A braking system for a bicycle comprising:
   a front wheel braking handle;
   a front wheel braking cable extending from the front wheel braking handle that actuates front wheel brakes;
   a back wheel braking handle mechanically connected to the front wheel braking handle;

a back wheel braking cable extending from the front wheel braking handle that actuates the back wheel brakes;

wherein the back wheel brakes are independently actuated from the front wheel brakes the front wheel brakes are actuated only when both the front wheel handle and back wheel handle are actuated; and wherein when only the front wheel braking handle is actuated neither the front wheel brakes or back wheel brakes are actuated.

2. The braking system of claim 1 wherein the front wheel braking handle and the back wheel braking handle are mechanically connected with an interconnecting braking cable.

3. The braking system of claim 2 wherein the front wheel braking handle has a rocker that is secured to the interconnecting cable and to the front wheel braking cable such that when the interconnecting cable is pulled taut the rocker pulls the front wheel braking cable.

4. A braking system for a bicycle having a frame, front and back wheels and a handle bar wherein the braking system has a front and back wheel braking handles, and front and back wheel braking cables that actuate front and back wheel brakes of the front and back wheels respectfully, comprising:

a interconnecting braking cable secured between the back wheel braking handle and the front wheel braking handle such that when the back wheel braking handle is actuated the interconnecting braking cable is pulled taut and the back wheel braking cable is actuated; and a rocker disposed within the front wheel braking handle and secured to the front wheel braking cable and secured to the interconnecting braking cable such that when the front wheel braking handle is actuated the rocker only actuates the front wheel braking cable when the interconnecting braking cable is pulled taut.

* * * * *